United States Patent [19]

Frommer et al.

[11] Patent Number: 4,599,194
[45] Date of Patent: Jul. 8, 1986

[54] SIMULTANEOUS POLYMERIZATION, DOPING AND SOLUBILIZATION OF HETEROCYCLIC POLYMERS, SOLUTIONS AND CAST ARTICLES

[75] Inventors: Jane E. Frommer, Mendham Township, Morris County; Ronald L. Elsenbaumer, Morristown, both of N.J.

[73] Assignee: Allied Corporation, Morris Township, Morris County, N.J.

[21] Appl. No.: 621,404

[22] Filed: Jun. 18, 1984

[51] Int. Cl.$^4$ .......................... H01B 1/20; A01B 1/06
[52] U.S. Cl. .................................. 252/518; 252/500; 524/401
[58] Field of Search ................. 252/500, 518; 524/401

[56] References Cited

U.S. PATENT DOCUMENTS

| | | | |
|---|---|---|---|
| 4,375,427 | 3/1983 | Miller et al. | 252/512 |
| 4,440,669 | 4/1984 | Ivory et al. | 252/518 |
| 4,452,727 | 6/1984 | Frommer et al. | 252/518 |
| 4,462,929 | 7/1984 | Shachlette et al. | 252/518 |
| 4,501,686 | 2/1985 | Hotta et al. | 252/500 |

OTHER PUBLICATIONS

G. Kossmehl et al., Makromel Chem., Rapid, Commun., vol. 2, pp. 551–555 (1981), "Electrical Conductivity of Poly(2,5-thiophenediyl)-AsF$_5$-Complexes.

*Primary Examiner*—Paul Lieberman
*Assistant Examiner*—Robert A. Wax
*Attorney, Agent, or Firm*—Gerhard H. Fuchs; Alan M. Doernberg

[57] ABSTRACT

Polymer solutions are formed by reacting an aromatic heterocyclic such as thiophene, substituted thiophenes or oligomers of either with an acceptor doping agent (Lewis Acid) such as arsenic pentafluoride in the presence of certain solvents such as arsenic trifluoride. Articles such as air-stable conductive poly(3-methylthiophene) are cast from such solutions.

33 Claims, No Drawings

SIMULTANEOUS POLYMERIZATION, DOPING AND SOLUBILIZATION OF HETEROCYCLIC POLYMERS, SOLUTIONS AND CAST ARTICLES

BACKGROUND OF THE INVENTION

The present invention relates to reaction of heterocyclic monomers or oligomers with certain dopants in the presence of certain solvents to form solutions, and to solutions of polyheteroaromatics and articles cast therefrom.

Conductive solutions of polymers such as poly(phenylene sulfide) are described U.S. Pat. No. 4,452,727 to Frommer et al. (June 5, 1984) formed by reacting the polymer, a solvent such as liquid arsenic trifluoride and an acceptor dopant such as arsenic pentafluoride. It had previously been indicated in U.S. Pat. No. 4,375,427 to Ivory et al. (Mar. 1. 1983) that gaseous arsenic trifluoride improves the doping of solid poly(phenylene sulfide) by arsenic pentafluoride. In both of these patents and related articles, benzothiophene structures are indicated as forming in poly(phenylene sulfide) when acceptor doped.

Heterocyclic polymers such as polythiophene, polypyrrole, poly-N-methylpyrrole, poly-3-methylthiophene and poly-3,4-dimethylthiophene have been prepared and acceptor-doped to conductivities in the same general range ($10^{-6}$ to 1 S/cm) common for acceptor-doped poly(phenylene sulfide). Normally, however, these heterocyclic polymers are prepared from the monomers electrochemically, thereby simultaneously polymerizing and doping. Such electrochemical preparation commonly results, however, in poor yields and enables only the formation of insoluble thin films on conductive substrates or peeled off of such substrates. The ability to process doped polymers is limited. Some of these heterocyclic polymers have also been prepared chemically (see EPO, 95,412 of Thompson-CSF and EPO 97,893 of Bayer AG) and then doped chemically. See also G. Kossmehl et al., Makromol, Chem., Rapid, Commun., Vol. 2, pp. 551-555 (1981). Here, uniform doping of desirable shapes can be awkward, complex or impossible.

Certain conductive polymers are known to polymerize further in the solid state (e.g. from oligomers to higher polymers) when doped. U.S. Pat. No. 4,440,069 to Ivory et al. (Apr. 3, 1984) discloses such polymerization at col. 5, lines 57-68 and Examples 8-11 for phenylene oligomers.

BRIEF DESCRIPTION OF THE INVENTION

The present invention is based upon the discovery that heterocyclics such as thiophene and its derivatives can be simultaneously polymerized, doped and solubilized by a combination of a doping agent such as arsenic pentafluoride and a solvent such as liquid arsenic trifluoride. Accordingly, the present invention includes a method of forming a solution which comprises reacting at least one monomer selected from the group consisting of heterocyclic aromatics having at least one chalcogenide, nitrogen or phosphorus heteroatom or oligomers of such heterocyclic aromatics with an electron acceptor doping agent in the presence of a solvent selected from the group consisting of arsenic trifluoride, arsenic trichloride, arsenic tribromide, phosphorus trifluoride, phosphorus pentafluoride, phosphorus trichloride, phosphorus oxytrichloride, titanium tetrachloride, boron trifluoride, boron trichloride, boron tribromide, antimony trichloride, antimony pentachloride, and volatile chloroalkanes, the solvent being present in an amount sufficient to form a solution having a viscosity less than about 1000 centipoise, the solution containing a polymer with repeat units derived from the monomer at least partially doped by a dopant derived from the doping (and polymerization) agent (e.g., a Friedel Crafts Lewis Acid).

The present invention also includes a novel solution comprising such a solvent and, dissolved therein, a polymer solute consisting essentially of heterocyclic aromatic repeating units with heteroatoms being chalcogenide, nitrogen or phosphorus linked by carbon-carbon bonds or carbon-heteroatom bonds between atoms of adjacent rings and a dopant solute derived from an acceptor doping agent.

The present invention also includes processes of casting articles from the solution formed in the above method, alone or in composite structures, and articles so cast.

DETAILED DESCRIPTION OF THE INVENTION

The solvent used in the present invention is preferably arsenic trifluoride, but it may also be other metal or non-metal halides having a liquid phase under atomspheric pressure for at least one temperature between about $-150°$ C. and about $+100°$ C., with preferably a liquid point at atmospheric pressure for at least one temperature between about $-100°$ C. and about $+30°$ C. Such solvents include especially phosphorus trifluoride, phosphorus pentafluoride, phosphorus trichloride, phosphorus oxytrichloride, titanium tetrachloride, boron trifluoride, boron trichloride, boron tribromide, antimony pentachloride, antimony trichloride, arsenic trichloride and arsenic tribromide, in addition to arsenic trifluoride.

The solvent may also be chloroalkane liquid in the above temperature range and volatile (to the extent of at least 7 kPa vapor pressure at 100° C. or below). Preferred chloroalkanes include dichloromethane.

The monomers used to form the polymer solute include, especially, five-member monoheterocyclic aromatics of the formula:

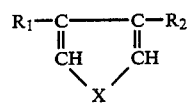

wherein X is S, O, Se, NH, NR', PH or PR'; $R_1$ is H alkyl, —OR, —SR or aryl; $R_2$ is H, alkyl, —OR, —SR or aryl; R is alkyl or aryl; and R' is alkyl or aryl. Exemplary of these preferred monomers are thiophene, 3-methylthiophene, 3,4-dimethylthiophene, 3-phenylthiophene, selenophene, pyrrole, N-methylpyrrole, 3-methylpyrrole, 3-phenylthiophene, 3-methylthiophene, and furans. Other monomers useful include benzothiophene, dibenzothiophene and other, similar fused ring structures and substituted forms thereof knowm to form conductive polymers when acceptor-doped (see O. K. Kim, J. Polym. Sci., Polym. Letters Ed., Vol. 20, pp. 663-66 (1982); G. Tourillon et al., J. Electroanal. Chem., Vol. 135, pp. 173-178 (1982), the disclosures of which are incorporated by reference for such polymers). Also included as suitable monomers are dibenzofuran, dibenzothiophene, phenazine, carbazole, pyridine, quinazoline, thiazole, thianthrene, thianaphthene and quinoxaline.

In addition to monomers, oligomers such as bithiophene, terthiophene, di(3-alkylthiophene), di(3,4-dialkylthiophene), di(3-alkoxythiophene), di(3,4-dialkoxythiophene), di(3-thioetherthiophene), and di(3-methyl, 4-methythiothiophene) can be used. Furthermore, mixtures of monomers can be used of at least three types: (1) two or more heterocyclic aromatic monomers (or oligomers), (2) one or more heterocyclic aromatic monomers (or oligomers) with a substituted or unsubstituted aromatic hydrocarbon monomer or oligomer (e.g., benzene, toluene, phenol, thiophenol, anisole, biphenyl, naphthalene, anthracene), (3) mixtures of one or more heterocyclic aromatic monomer or oligomer with acetylene (and optionally also an aromatic hydrocarbon oligomer). Preferred combinations of monomers are tabulated below:

| Exemplary Copolymer | First Heterocyclic Monomer | Second Monomer | Third Monomer |
| --- | --- | --- | --- |
| 1 | Thiophene | 3-MT | — |
| 2 | Thiophene | 3-MThT | — |
| 3 | Thiophene | 3-MOT | — |
| 4 | Pyrrole | 3-MPy | — |
| 5 | Pyrrole | N—MPy | — |
| 6 | Pyrrole | 3-MT | — |
| 7 | N—MPy | Thiophene | — |
| 8 | 3-MT | Benzene | — |
| 9 | 3-MT | Naphthalene | — |
| 10 | Pyrrole | 3-MT | Benzene |
| 11 | Furan | Thiophene | — |
| 12 | Furan | Biphenyl | — |
| 13 | Dibenzofuran | Thiophene | — |
| 14 | Dibenzofuran | Naphthalene | — |
| 15 | Thiophene | Acetylene | — |

Wherein
3-MT = 3-methylthiophene
3-MThT = 3-(methylthio)thiophene
3-MOT = 3-methoxythiophene
3-MPy = 3-methylpyrrole
N—MPy = N—methylpyrrole The dopant solute used in the present invention may be the product of any of the Lewis Acid halides or oxyhalides or mixtures thereof used as electron-acceptor doping agents in the preparation of conductive polymers based upon polyphenylene, poly(phenylene sulfide), poly(phenylene oxide), polyacetylene, polypyrroles or polythiophenes. Examples of such dopants include solutes generated by employing as reactant (doping agent) the neutral halides represented by arsenic pentafluoride, antimony pentafluoride, antimony pentachloride, molybdenum pentachloride, iron chlorides, iron oxychlorides, aluminum chloride, and molybdenum oxytetrachloride. Also included are the solutes generated by employing as reactant superoxidant salts such as the nitrosonium, nitrosonium, oxonium and dioxygenyl salts of hexafluoroarsenate, hexafluoroantimonate, hexafluorophosphate, and tetrafluoroborate. Also included are adducts such as the solid product of reaction between acetonitrile, AsF$_3$ and AsF$_5$, analyzed to have the stoichiometry: CH$_3$CN(AsF$_3$)$_{0.5}$(AsF$_5$)$_{0.5}$(HF). Since, in making the novel solutions of the present invention, the polymer may (in rare cases) be doped with the dopant prior to contact with the solvent, the dopant solute may also be an anion introduced electrochemically into the polymer in the manner described by MacDiarmid et al. in U.S. Pat. No. 4,321,114 (Mar. 23, 1982).

The proportions of monomers and/or oligomers, dopant and solvent are not particularly critical, but the following guidelines are believed important for achieving solutions particularly useful in the present invention. Insufficient amounts of doping agent will leave large amounts of monomer unreacted. For any given monomer/doping agent combination, minimum levels to achieve polymerization can be easily determined by experiments with excess solvent. Increased levels of doping agent beyond the minimum will normally result in increased conductivity of articles cast from the solution up to a level at which more doping agent fails to result in significant increases of conductivity. Excesses of doping agent beyond this level are not excluded, but very large excesses (over twice this level) are not preferred.

The amount of solvent as a proportion of the amount of doped polymer is not believed to be critical, since any amount of solvent as a liquid will form at least a viscous gel with highly doped polymer. It is preferred, however, to use sufficient liquid solvent to lower the viscosity of the gel or solution to a point where it flows at least sufficiently to conform to a container shape or mold in a reasonably short period (e.g. in 30 minutes or less). Preferably, the solvent is present in sufficient amounts to lower the viscosity to less than about 1000 centipoise, more preferably between about 1 to 100 centipoise.

In addition to the monomers, the dopant and the solvent, fourth components may also be present which either dissolve or do not dissolve in the solution. In the case of dissolvable components, materials may be present which alter the physical or mechanical properties of either the solution or the article eventually cast from the solution. Examples of such materials include polymers, conductive polymers, fillers plasticizers, blowing agents (for foams), metal flakes, and stabilizers. In the case of non-soluble fourth components, materials may be present which either fill or form a substrate for the conductive polymer cast from the solution. These fourth components include other conductive polymers, other polymers such as polyacetylene, polyphenylene and poly(phenylene sulfide) which may be conductive upon doping, graphite, metal conductors, reinforcing fibers and inert fillers (such as clays and glass).

In the solution-forming method of the invention, the monomers and/or oligomers are reacted with the doping agent in the presence of the solvent. While various orders of addition are suitable, it is preferred to premix the monomers and/or oligomers with the solvent (e.g., arsenic trifluoride with thiophene) in the absence of doping agent. In many cases a single liquid phase will be present at this stage. Any fourth components can be added with or after these two ingredients. Preferably, the mixture is kept relatively cold at this point to prevent evaporation of solvent, development of pressure or reaction between monomer and solvent and to moderate reaction rate upon subsequent doping. Doping agent is then added, and temperature is desirably controlled by cooling (since the doping/polymerization process is generally exothermic). Mixing is often desired, especially if the doping agent has limited solubility in the liquid or is introduced as a gas above the liquid or introduced in solid form.

Under suitable conditions, a solution visibly different (in color) from the mixture without dopant will result rapidly. Reaction times after addition of doping agent need generally not exceed four hours, with 2–10 hours being generally suitable. For arsenic trifluoride/3-methyl-thiophene, for example, reaction at −78° C. was generally complete in less than 4 hours.

While the solutions formed by the above method are quite generally useful, solutions wherein the polymer formed consists essentially (is at least 90%) repeating units derived from heterocyclic aromatics differ from the solutions of our U.S. Pat. No. 4,452,727 in one material respect: these novel solutions have not been prepared from the preformed polymer (e.g., polythiophene), dopant and solvent whereas the polymers indicated in U.S. Pat. No. 4,452,727 (e.g., poly(phenylene sulfide), poly(phenylene oxide) and poly(thio-2,8-dibenzothiophendiyl) were polymerized and then dissolved. This is illustrated by the following four structures:

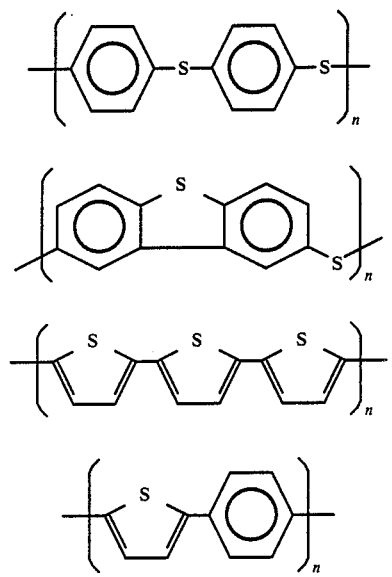

Structures I and II can be made conductive in solutions by the methods of U.S. Pat. No. 4,452,727 (see Examples 1 and 5 as well as Example 17 of U.S. Pat. No. 4,375,427). Structure III has been formed into doped solutions by simultaneous doping and polymerization (while solubilizing) according to the present method. Structures such as a IV should also be obtainable in solution by the present method.

EXAMPLE 1

3-Methylthiophene (1.0 ml, 10.2 mM) was placed in a glass reactor (250 ml volume). The sample was degassed by cooling to −196° C., evacuating, warming to room temperature, recooling to −196° C., and reevacuating. Arsenic trifluoride (10 ml) was then transferred in under vacuum in the gas phase and condensed (to a solid) on top of the 3-methylthiophene which was held at −196° C. The cell was then placed in a −78° C. bath and exposed to gaseous $AsF_5$ (500 Torr in a large volume). An immediate color change was observed on combination of these reagents from light yellow through deep orange to red. At this temperature (−78° C.) the $AsF_3$/3-methylthiophene mixture was solid. The cell was allowed to warm gradually to room temperature. The solution was stirred with a magnetic stir bar as it thawed to room temperature, and underwent, on consumption of $AsF_5$, further color changes to deep green. The cell was continuously recharged with $AsF_5$ during the above proceedings to maintain a pressure of 500 Torr for 4 hours. Volatiles were then removed under vacuum leaving an oily residue and solids which were extracted in air with water and dried under vacuum. The resulting dry solids were pressed into a pellet which displays a conductivity in air of 0.4 S/cm. This conductivity remained unchanged over the monitoring period of 4 months. Elemental analysis provided a stoichiometry of $C_{5.13}H_{4.31}S_{1.0}[AsF_{6.1}]_{0.15}$.

EXAMPLE 2

Same as Example 1, except that solid products were washed in air with isopropanol (instead of water). On drying this product showed a conductivity of 1.3 S/cm.

EXAMPLE 3

Same as Example 1, except the solid products were washed with isopropanol in an inert atmosphere. After drying, the conductivity were 1.3 S/cm.

EXAMPLE 4

Same as Example 1, except that the solid product was washed in air with dilute sulfuric acid in isopropanol. After drying, the conductivity was 0.7 S/cm.

EXAMPLE 5

Same as Example 1, except that the solid product was washed with dilute sodium hydroxide in isopropanol. This material was different from examples 1–4 in that it sports a red (instead of black) color and had a lower conductivity of $3 \times 10^{-4}$ S/cm.

EXAMPLE 6

Same as Example 1, except the polymerization/doping solution was allowed to react for 4½ hours. The solid product, after being washed in air with isopropanol and dried under vacuum, displayed an air-stable conductivity of 1 S/cm over the monitoring period of seven months.

EXAMPLE 7

Same as Example 6, except the solid products were crushed to a fine powder and washed with isopropanol. On drying in a vacuum, a pressed pellet of these powders had an air-stable conductivity of 4.1 S/cm.

EXAMPLE 8

Same as Example 7, except the crushed powders were washed with water. On drying in a vacuum, a pressed pellet of the powder had a conductivity of 1.6 S/cm.

EXAMPLE 9

$\alpha,\alpha'$-Bithiophene, $[C_4H_3S_1]_2$, (350 mg, 3.6 mM in thiphene units) was placed in a glass reactor, degassed, and cooled to −196° C. $AsF_3$ (∼10 ml) was then transferred into the same cooled cell under vacuum. The cell was then allowed to warm to room temperature whereupon the stirring solution took on a gold color. A change in color to red, then green, then blue was observed on exposure to a constant pressure of $AsF_5$ (500 Torr) over the next 7 hours. The solution was further exposed to this pressure of $AsF_5$ for an additional 16 hours. At this point the deep blue solution was filtered and concentrated slowly under vacuum. After 4.5 hours of concentrating, the solution gelled. An additional 18 hours under vacuum yielded a solid whose conductivity (measured under an inert atmosphere) was 2.1 S/cm.

EXAMPLE 10

Same as Example 9, except that the doped polymer solution gelled while sitting under $AsF_5$ (500 T) for 18 hours. The conductivity in an inert atmosphere after drying was $2.4 \times 10^{-2}$ S/cm).

EXAMPLE 11

(3,3'-dimethyl)-$\alpha,\alpha'$-bithiophene (1 ml, 11 mM in thiophene units) was degassed in a glass reactor and cooled to $-78°$ C. $AsF_3$ ($\sim 8$ ml) was transferred in under vacuum to the cooled reactor. A slight yellow color was observed on combination of the thiophene with solvent. $AsF_5$ (500 T) was admitted to the cooled cell and rapid reaction was evidenced by a color change from yellow to orange to brown to green, and finally to blue, over several minutes. The cell was warmed gradually to room temperature and the deep blue, viscous solution was left stirring under 500 Torr $AsF_5$ 18 hours. During this time, the solution gelled. After drying under vacuum, the solids displayed a conductivity in an inert atmosphere of $10^{-2}$ S/cm.

EXAMPLE 12

3-Methylthiophene (1 ml, 10.2 mM) and polyethylene glycol (PEG) (ave. mw=1000) (40 mg, $\sim 1$ mM in $C_2H_4O$ units) were loaded separately into the two chambers of a glass reactor. The reactor was evacuated adn $AsF_3$ (5 ml) was transferred in under vacuum to the cooled ($-196°$ C.) PEG. The PEG dissolved in $AsF_3$ on warming to room temperature. The PEG solution was then exposed to $AsF_5$ to test for reaction between the plasticizer and dopant. None was observed. The PEG solution was decanted onto the thiophene and the resulting mixture was exposed to $AsF_5$ (400 Torr). Over 15 minutes the solution passed from pink to red to purple. The solution was stirred for 18 hours. An additional 2 hours of stirring under 500 Torr $AsF_5$ caused the solution to turn black and then gel. After removal of volatiles under vacuum, the bronze-colored solid displayed a conductivity of $10^{-2}$ S/cm.

EXAMPLE 13

$\alpha,\alpha'$-Bithiophene, $[C_4H_3S_{1.0}]_2$ (150 mg, $\sim 1.8$ mM in thiophene units), was placed in one chamber of glass reactor. In the second chamber was placed the solid dopant $(CH_3CN) \cdot (AsF_3)_{0.5} \cdot (AsF_5)_{0.5} \cdot (HF)$ [1.33 g, 6.33 mM, prepared by the reaction of $AsF_5$ gas with a solution of $AsF_3$ (1 ml) in acetonitrile (10 ml)]. Methylene chloride (25 ml) was transferred under vacuum with cooling into the reactor and the contents of the two chambers were combined. On warming to room temperature, a color change from yellow to orange to brown to green-blue was observed over 1 minute. After 2 hours the purple solution was filtered, then left stirring 16 hours. Volatiles were removed under vacuum, leaving a black powder. The conductivity, measured on a pressed pellet in an inert atmosphere, was 0.22 S/cm. Extraction of the powder with methylene chloride in air, followed by drying under vacuum, resulted in a pressed pellet with an air-stable conductivity of 1.0 S/cm. Compensation (neutralization) of the doped polymer with potassium hydroxide in isopropanol, followed by isopropanol and ethanol washes, yielded a powdered material whose CP-MAS NMR spectrum indicated that polymerization had occurred solely in the alpha positions. X-ray diffraction and elemental analysis both indicated a polymeric phase (amorphous) and occluded inorganics (potassium fluoroarsenic oxides, crystalline).

EXAMPLE 14

Pyrrole (550 mg, 8.2 mM) was placed in a glass reactor, cooled to $-60°$ C., and evacuated. $AsF_3$ (25 ml) was then transferred into the same cell, now at $-196°$ C., under vacuum. The solution was warmed to room temperature whereupon it assumed a yellow color. $AsF_5$ (550 Torr) was exposed to the stirring solution. Over 5 minutes the solution underwent color changes from yellow to orange to red to green to black-green to purple and finally to burgundy. The stirring burgundy solution was left under 650 Torr $AsF_5$ for 18 hours. After filtration, the solution reduced down under vacuum to yield a thick, flexible, damp film. Extraction of the film with either isopropanol in air, or methylene chloride under an inert atmosphere, resulted, on drying in brittle black films.

What is claimed is:

1. A method of forming a solution which comprises reacting at least one monomer selected from the group consisting of heterocyclic aromatics having at least one chalcogenide, nitrogen or phosphorus heteroatom, or oligomers of such heterocyclic aromatics with an electron acceptor doping agent in the presence of a solvent selected from the group consisting of arsenic trifluoride, arsenic trichloride, arsenic tribromide, phosphorus trifluoride, phosphorus pentafluoride, phosphorus trichloride, phosphorus oxytrichloride, titanium tetrachloride, boron trifluoride, boron trichloride, boron tribromide, antimony trichloride, antimony pentachloride, and volatile chloroalkanes, the solvent being present in an amount sufficient to form a solution having a viscosity less than about 1000 centipoise, the resulting solution containing a polymer with repeat units derived from the monomer at least partially doped by a dopant derived from the doping agent.

2. The method of claim 1 wherein the monomer is a five-member monoheterocyclic aromatic of the formula:

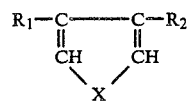

wherein X is S, O, Se, NH, NR', PH or PR'; $R_1$ is H alkyl, —OR, —SR or aryl; $R_2$ is H, alkyl —OR, —SR or aryl, R is alkyl or aryl; and R' is alkyl or aryl.

3. The method of claim 2 wherein X is S.

4. The method of claim 3 wherein $R_1$ and $R_2$ are each H, alkyl of 1-6 carbons, oxyalkyl of 1-6 carbons or thioalkyl of 1-6 carbons.

5. The method of claim 4 wherein the monomer is thiophene.

6. The method of claim 4 wherein the monomer is 3-methylthiophene.

7. The method of claim 4 wherein the monomer is 3,4-dimethylthiophene.

8. The method of claim 4 wherein the solvent is arsenic trifluoride.

9. The method of claim 3 wherein the solvent is arsenic trifluoride.

10. The method of claim 2 wherein X is NR'.

11. The method of claim 2 wherein R' is alkyl of 1-6 carbons or phenyl.

12. The method of claim 11 wherein the solvent is arsenic trifluoride.

13. The method of claim 11 wherein one of $R_1$ and $R_2$ is alkyl of 1-6 carbons, and the other of $R_1$ and $R_2$ is H or alkyl of 1-6 carbons.

14. The method of claim 1 comprising reacting an oligomer of a five-membered monoheterocyclic aromatic of the formula:

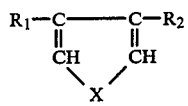

wherein X is S, O, Se, NH, NR', PH or PR'; $R_1$ is H alkyl, —OR; —SR or aryl; $R_2$ is H. alkyl —OR, —SR or aryl; R is alkyl or aryl; and R' is alkyl or aryl.

15. The method of claim 1 wherein the doping agent is a group V metal pentahalide.

16. The method of claim 15 wherein the group V metal pentahalide is arsenic pentafluoride.

17. A solution comprising a solvent selected from the group consisting of arsenic trifluoride, arsenic trichloride, arsenic tribromide, phosphorus trichloride, phosphorus pentafluoride, phosphorus trifluoride, phosphorus oxytrichloride, titanium tetrachloride, boron trifluoride, boron trichloride, boron tribromide, antimony trichloride, antimony pentachloride, and volatile chloroaklanes, a polymer solute consisting essentially of heterocyclic aromatic repeating units with heteroatoms being chalcogenide, nitrogen or phosphorus lined by carbon-carbon or heteroatom-carbon bonds between atoms of adjacent rings, and a dopant solute derived from an acceptor doping agent.

18. The solution of claim 17 wherein the repeating units are of the formula:

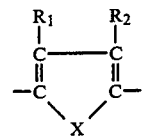

wherein X is S, O, Se, NH, NR', PH or PR'; $R_1$ is H alkyl, —OR, —SR or aryl; $R_2$ is H, alkyl —OR, —SR or aryl; R is alkyl or aryl; and R' is alkyl or aryl.

19. The solution of claim 18 wherein X is S.

20. The solution of claim 19 wherein $R_1$ and $R_2$ are each H, alkyl of 1-6 carbons, oxyalkyl of 1-6 carbons or thioalkyl of 1-6 carbons.

21. The solution of claim 20 wherein $R_1$ and $R_2$ are each H.

22. The solution of claim 20 wherein, for each repeating unit, one of $R_1$ and $R_2$ is H and the other of $R_1$ and $R_2$ is methyl.

23. The solution of claim 10 wherein $R_1$ and $R_2$ are each alkyl of 1-6 carbons.

24. The solution of claim 20 wherein the solvent is arsenic trifluoride.

25. The solution of claim 19 wherein the solvent is arsenic trifluoride.

26. The solution of claim 18 wherein X is NR'.

27. The solution of claim 26 wherein R' is alkyl of 1-6 carbons or phenyl.

28. The solution of claim 27 wherein the solvent is arsenic trifluoride.

29. The solution of claim 27 wherein one of $R_1$ and $R_2$ is alkyl of 1-6 carbons and the other of $R_1$ and $R_2$ is H or alkyl of 1-6 carbons.

30. The solution of claim 17 wherein the dopant solute is derived from a group V metal pentahalide.

31. The solution of claim 30 wherein the group V metal pentahalide is arsenic pentafluoride.

32. An article prepared by evaporating the solvent from the solution of claim 17.

33. An article prepared by evaporating solvent from a solution prepared by the method of claim 1.

* * * * *